Aug. 27, 1940.    G. W. ASHLOCK, JR    2,212,892
FRUIT PITTING MACHINE
Filed March 21, 1940    3 Sheets-Sheet 1
FIG_1_
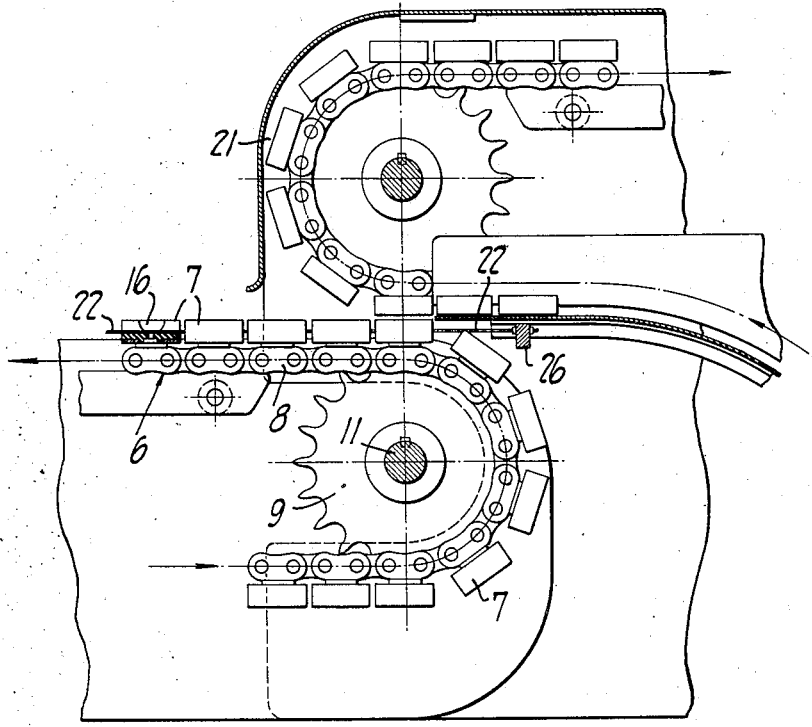
FIG_2_
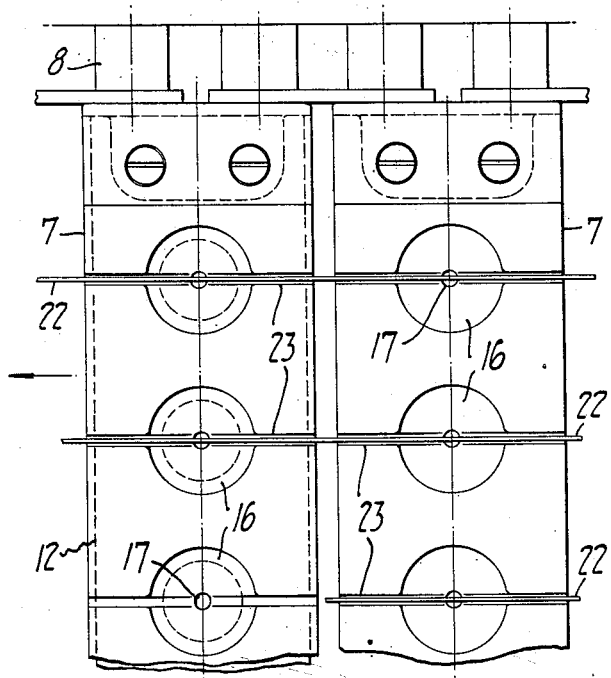
FIG_3_
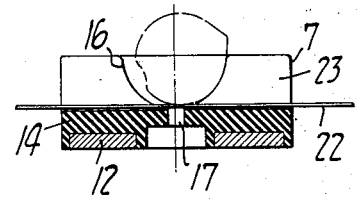
FIG_4_
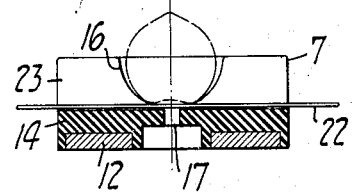
INVENTOR
George W. Ashlock Jr.
BY Robert H. Eckhoff
ATTORNEY Aug. 27, 1940.   G. W. ASHLOCK, JR   2,212,892
FRUIT PITTING MACHINE
Filed March 21, 1940   3 Sheets-Sheet 2
FIG_5_
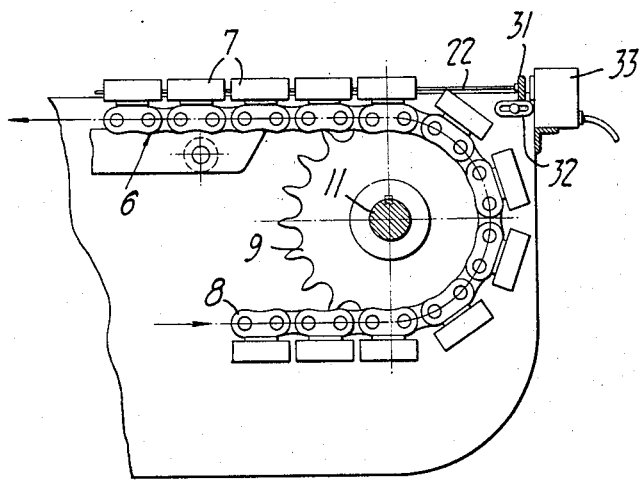
FIG_6_
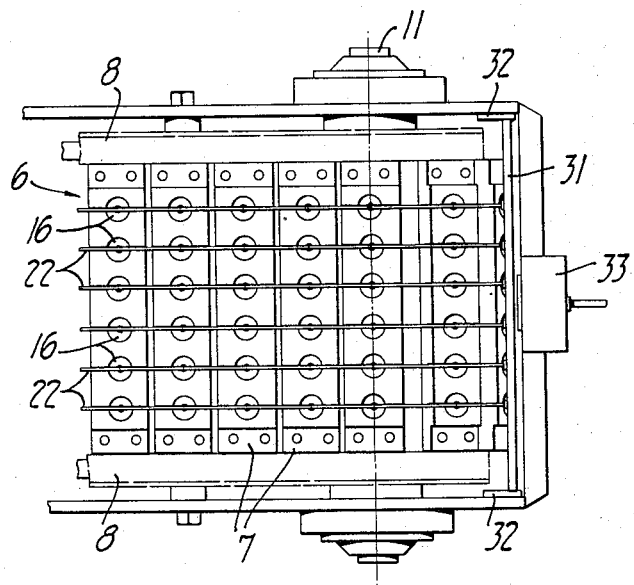
INVENTOR
George W. Ashlock Jr.
BY Robert H. Eckhoff
ATTORNEY Aug. 27, 1940.  G. W. ASHLOCK, JR  2,212,892
FRUIT PITTING MACHINE
Filed March 21, 1940  3 Sheets-Sheet 3
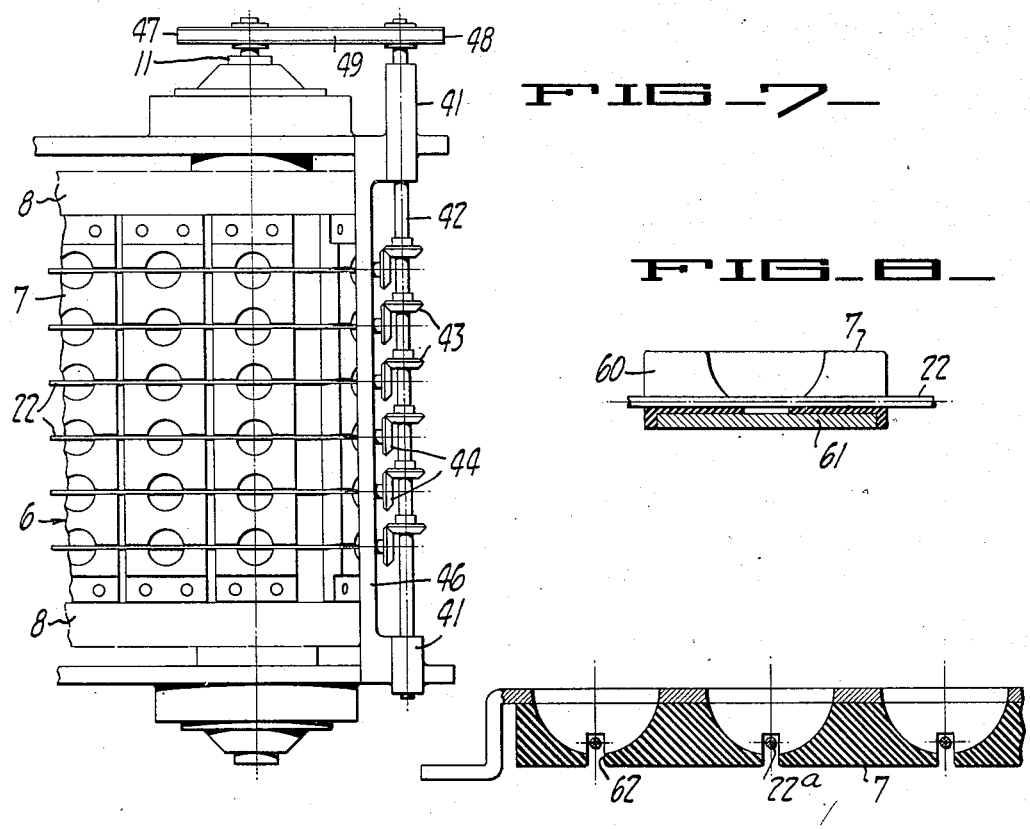
INVENTOR
George W. Ashlock Jr.
BY Robert H. Eckhoff
ATTORNEY

UNITED STATES PATENT OFFICE 2,212,892

FRUIT PITTING MACHINE

George W. Ashlock, Jr., Oakland, Calif.

Application March 21, 1940, Serial No. 325,243

10 Claims. (Cl. 198—33)

This invention relates to fruit pitting machinery.

In the Goranson et al. Patent Number 1,742,653 of January 7, 1930, there is disclosed a machine for pitting fruit, particularly one enabling a fruit, such as cherries, to be positioned with the depression or "dimple" in the fruit accurately centered in an opening in a fruit holder prior to operation of a pitting knife. This invention is concerned with such machines, and, more particularly, with an improved machine having a very high rate of throughput.

Goranson depends upon a rotating or vibrating finger which operates through the holder opening to rotate the fruit into position. With a heavy fruit such as a peach, so much force is required and such speed given the finger that damage and bruising of the fruit frequently results. The disadvantage of this should be obvious.

With different grades of fruit, for example, different grades of cherries, the machine must be very accurately adjusted to each grade to secure the proper centering action. This results in delay.

The machine of the present invention operates satisfactorily to center fruit practically independently of the weight thereof so that the dimple or depressioon is on the bottom. It is useful in the centering of cherries, peaches, plums, apricots, as well as vegetables such as tomatoes. It is also useful on beets if the stem end is properly cut off close to the beet to provide a flat surface.

The general object of this invention is to provide a simple means for centering fruit with accuracy and rapidity of action to the end that the fruit holder presents the fruit to the pitting knife or cutting knife with the fruit properly centered in the holder.

In the drawings accompanying and forming a part hereof, I have disclosed a presently preferred embodiment of the invention, as described in the following specification.

Figure 1 is a side elevation through a machine of the present invention.

Figure 2 is a fragmentary plan view of a holder constructed in accordance with this invention.

Figures 3 and 4 are diagrammatic views illustrating operation of the machine of the present invention.

Figure 5 is a side elevation illustrating a modification of the present invention.

Figure 6 is a plan view of the structure shown in Figure 5.

Figure 7 is a plan view of another modification of a machine of the present invention.

Figure 8 is a section illustrating another modification of fruit carrier construction.

Figure 9 is a sectional view representing another fruit carrier rod construction.

Figure 10 is a section along the line 10—10 of Figure 9.

Figure 11 is a section taken through another modification of the carrier-member structure.

In general the machine of the present invention includes a cuplike receptacle recessed adjacent its bottom to permit an elongated member to be moved relative to fruit placed haphazardly in the receptacle whereby movement between the receptacle and the elongated member causes the fruit to be rotated in the receptacle until it is in a selected final position wherein that face, capable of supporting the article stably on a plane surface, is positioned in engagement with the cuplike receptacle with the said face parallel to a horizontal plane or substantially so. When the article is unstably supported in the cuplike receptacle and the elongated member is present in the receptacle, the article will, in fact, be supported partly by the elongated member and partly by the cuplike receptacle. It is only when the article is stably positioned with said face horizontal that the article will not be moved or rotated by the relative movement between the elongated member and the receptacle. This can be achieved in various ways as will now be described.

As appears in Figure 1, I provide a fruit receiving conveyor indicated generally at 6. This conveyor is suitably made up after the manner of conveyor 10 as disclosed in my United States Patent Number 2,157,518 of May 9, 1939. As appears in said patent, a plurality of fruit holders, identified herein as 7 are positioned between oppositely provided conveyor chains 8 extending over sprockets 9 on shaft 11. Each fruit holder is made up of a metal strip 12 having integrally bonded thereto suitably apertured rubber facing sheet 14 as is disclosed in my application Serial Number 260,968, filed March 10, 1939. This sheet is formed to provide one or more hemispherical depressions 16 therein which I term cuplike receptacles. When a pitting knife is employed a centrally positioned aperture 17 extends through each receptacle to pass the pit.

The conveyor 6 usually moves horizontally, as appears in Figure 1, as the conveyor advances the articles toward a suitable working or fruit handling mechanism, such as the pitting machine disclosed in my aforementioned patent, or to some other suitable machines for cutting, peeling, trimming, pitting, stoning, halving, quartering, or performing any other suitable operation. The conveyor 6 is suitably fed with articles to be handled but I prefer to provide a second conveyor indicated generally at 21 carrying articles toward conveyor 6, and depositing them on conveyor 6 as is disclosed in my United States Patent No. 2,190,970 of February 20, 1940.

In accordance with this invention, means are provided for turning the fruit in the fruit holder to position the fruit with the dimple or depression therein in a down position as in Figure 4. In accordance with this invention, I provide a rod member indicated generally at 22 extending through a slot 23 formed in each fruit holder. This rod member is preferably mounted from a support indicated at 26 in the frame of the machine, and is so positioned that, as the conveyor advances over its path, the rod is positioned adjacent the bottom of the slot 23 and the receptacle in each fruit holder. Usually a length of about one foot suffices for each rod, this length being measured after the fruit or vegetables have been positioned in a haphazard position on conveyor 6 and in the carrier receptacles therein. As appears in Figure 3, the fruit deposited in the receptacle engages the rod and, upon relative movement between the rod and the fruit holder, is rotated by the rod until it comes to rest in the fruit holder with the dimple down and adjacent to the rod, as in Figure 4. In this position the fruit is out of engagement with the rod, or slides over the face of the rod and no longer rotates in the receptacle as it does until centered.

The rod members are preferably made of wire but they may be made of other suitable materials such as wood or roughened glass. Furthermore, the members may be round or of any other suitable cross-section. The essential thing to operation is the relative movement between the rod and the fruit holder and the rotation of the fruit thereby obtained.

It is to be noted that the rod members are accurately located, and remain in position during the movement of the conveyor. Therefore the conveyor 6 can be moved as rapidly as is practical in conjunction with other operations being performed so that a rapid delivery of properly positioned fruit is possible without any great mass of reciprocating parts which, of necessity, must be coordinated with other rapidly moving parts. In this connection, it is to be remarked that the capacity of the machine, per row of fruit handled, is at least double that of prior art machines heretofore employed.

Under some circumstances it is desirable to impart further relative motion to each rod member 22 so that sticky fruit is forcibly turned in its holder. Thus, in Figures 5 and 6, I have shown the several rod members 22 as attached to a common header 31 suitably positioned by members 32 on the side of the machine. A magnetic vibrating unit 33 operating on alternating current, a structure well known to those skilled in the art, is employed to vibrate the header 31 and the rod members attached thereto. The period of vibration can vary over a wide range and I have successfully used a frequency of 7200.

In Figure 7 I have shown a frame 41 mounted upon the side of the machine and carrying a shaft 42 thereon. A plurality of gears 43 is mounted upon the shaft 42 and each drives a gear 44 mounted upon the end of one of the rods 22. In this instance, each rod 22 is suitably journalled in a supporting bearing structure indicated generally at 46 so that the rod can be rotated positively as the carriers move. Shaft 42 is rotated off of shaft 11 by means of sprockets 47 and 48, and chain 49. If desired, a drive reversing mechanism can be included whereby the rods 22 are oscillated, i. e. rotated in opposite directions alternately.

In Figure 8 I have shown the first carrier 7 with a slot 60 therein extending from the top thereof to adjacent the bottom of the cuplike receptacle with the elongated member 22 riding in the slot and above the solid base 61 of the carrier. The member 22 can be stationary or movable; it can be rotated, vibrated or oscillated, all as described more particularly above.

In Figures 9 and 10 the carrier 7 is shown as of a solid construction with slot 62 formed therein extending upwardly from the bottom of each recepacle. In this instance the elongated member 22a, a rod, wire or the edge of a narrow strip, is positioned beneath the conveyor structure as appears in Figure 9; a member 66 is suitably supported from the frame provided for the machine. From this member extensions 67 support a plurality of the elongated members 22a each extending into a slot 62. As the conveyor is moved along its path, it rides over the several members 22a, the members each being within a slot and effective to rotate the fruit upon relative movement between the carriers and the elongated members. The elongated members can be stationary, vibrated, rotated or oscillated and to those skilled in the art various constructions suitable for supporting and moving the elongated members will be readily apparent.

It is not essential that the carrier structures be slotted to pass the rod or elongated member 22 and in Figure 11 I have shown such a construction. In this instance a cuplike receptacle 70 is formed in a metal plate 71 carried as a part of conveyor 72. The bottom of the receptacle is suitably formed to permit an unstably positioned article therein to depend slightly below the lowermost edges of the metal plate, so the article can engage the cooperatively positioned elongated member 22 which can be stationary, vibrated, rotated or oscillated.

This application is a continuation-in-part of my application Serial No. 284,864, filed July 17, 1939.

I claim:

1. A machine for positioning a generally spherical article having at least one face thereon capable of resting stably on a flat surface, said machine comprising a cuplike receptacle having an inner, substantially concave surface for supporting an article positioned therein, means for moving said receptacle substantially continuously over a path, and an elongated member positioned parallel to a portiono f said path and extending therealong with a surface thereon cooperatively adjacent the bottom of said recepacle, said receptacle being formed to permit said member to engage an unstably positioned article in said receptacle adjacent the bottom thereof.

2. A machine as in claim 1 wherein the member is stationary.

3. A machine as in claim 1 wherein the member is vibrated longitudinally.

4. A machine as in claim 1 wherein the member is rotated.

5. A machine for positioning a generally spherical article having at least one face thereon capable of resting stably on a flat surface, said machine comprising a cuplike receptacle for supporting an article positioned therein, means for moving said receptacle substantially continuously over a path, said receptacle having a slot therein extending in the direction of motion of said receptacle and to adjacent the bottom of said receptacle, and an elongated member positioned parallel to a portion of said path and extending therealong into said slot with a surface thereon adjacent the bottom of said receptacle.

6. A machine as in claim 5 wherein the member is stationary.

7. A machine as in claim 5 wherein the member is vibrated longitudinally in said slot.

8. A machine as in claim 5 wherein the member is rotated in said slot.

9. A machine as in claim 5 wherein the slot extends from the top of said receptacle to adjacent the bottom of said receptacle substantially centrally of said receptacle.

10. A machine as in claim 5 wherein a single slot is centrally positioned with respect to the receptacle and a single elongated member is provided for cooperation with said slot during movement of said receptacle over said path portion.

GEORGE W. ASHLOCK, Jr.